(12) United States Patent
Adya et al.

(10) Patent No.: US 7,760,654 B2
(45) Date of Patent: Jul. 20, 2010

(54) USING A CONNECTED WIRELESS COMPUTER AS A CONDUIT FOR A DISCONNECTED WIRELESS COMPUTER

(75) Inventors: Atul Adya, Redmond, WA (US); Paramvir Bahl, Sammamish, WA (US); Ranveer Chandra, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 11/047,190

(22) Filed: Jan. 31, 2005

(65) Prior Publication Data

US 2006/0077946 A1 Apr. 13, 2006

Related U.S. Application Data

(60) Provisional application No. 60/613,055, filed on Sep. 24, 2004.

(51) Int. Cl.
*H04L 12/26* (2006.01)
*H04W 4/00* (2009.01)
*H04W 24/00* (2009.01)
*G06F 15/173* (2006.01)

(52) U.S. Cl. ........................ 370/242; 370/245; 370/338; 455/423; 709/224

(58) Field of Classification Search ................. 709/220, 709/229; 370/329, 436, 242, 245
See application file for complete search history.

(56) References Cited

U.S. PATENT DOCUMENTS

| 5,729,680 | A  | * | 3/1998  | Belanger et al. ............ 709/222 |
| 6,282,577 | B1 | * | 8/2001  | Okanoue et al. ............ 709/250 |
| 6,307,843 | B1 | * | 10/2001 | Okanoue .................... 370/312 |
| 6,338,087 | B1 | * | 1/2002  | Okanoue .................... 709/222 |
| 6,370,146 | B1 | * | 4/2002  | Higgins et al. .............. 370/400 |
| 6,522,888 | B1 |   | 2/2003  | Garceran et al. |
| 6,664,925 | B1 |   | 12/2003 | Moore et al. |
| 6,721,305 | B1 |   | 4/2004  | Chan et al. |
| 6,799,047 | B1 |   | 9/2004  | Bahl et al. |
| 6,839,560 | B1 |   | 1/2005  | Bahl et al. |

(Continued)

FOREIGN PATENT DOCUMENTS

WO   WO 03/083601 A2   10/2003

(Continued)

OTHER PUBLICATIONS

Adya, A., Bahl, P., Chandra, R., and Qiu, L. Architecture and techniques for diagnosing faults in IEEE 802.11 infrastructure networks. In *Proc. of ACM Conference on Mobile computing and networking*, 2004.

(Continued)

*Primary Examiner*—Nick Corsaro
*Assistant Examiner*—Huy C Ho
(74) *Attorney, Agent, or Firm*—Wolf, Greenfield & Sacks, P.C.

(57) ABSTRACT

Systems and methods are described for using client conduits to enable bootstrapping and fault diagnosis of disconnected wireless clients. Client conduits are used to enable disconnected clients to diagnose their problems with the help of nearby clients. This technique may take advantage of the beaconing and probing mechanisms of IEEE 802.11 to ensure that connected clients do not pay unnecessary overheads for detecting disconnected clients. Methods are also described for detecting rogue devices disguising as disconnected clients.

25 Claims, 6 Drawing Sheets

U.S. PATENT DOCUMENTS

| | | | |
|---|---|---|---|
| 6,857,012 B2* | 2/2005 | Sim et al. | 709/222 |
| 6,990,428 B1 | 1/2006 | Kaiser et al. | |
| 6,992,625 B1 | 1/2006 | Krumm et al. | |
| 7,006,434 B1* | 2/2006 | Klein et al. | 370/223 |
| 7,020,475 B2 | 3/2006 | Bahl et al. | |
| 7,047,287 B2* | 5/2006 | Sim et al. | 709/221 |
| 7,068,599 B1 | 6/2006 | Jiang et al. | |
| 7,127,258 B2 | 10/2006 | Zegelin | |
| 7,133,909 B2 | 11/2006 | Bahl | |
| 7,159,026 B2 | 1/2007 | Lau et al. | |
| 7,184,421 B1* | 2/2007 | Liu et al. | 370/338 |
| 7,233,286 B2 | 6/2007 | Krumm et al. | |
| 7,251,685 B1 | 7/2007 | Yildiz | |
| 7,317,914 B2 | 1/2008 | Adya et al. | |
| 7,339,914 B2 | 3/2008 | Bhagwat et al. | |
| 2001/0022615 A1 | 9/2001 | Fernandez et al. | |
| 2002/0025795 A1 | 2/2002 | Sharon et al. | |
| 2003/0118015 A1 | 6/2003 | Gunnarsson et al. | |
| 2003/0217130 A1 | 11/2003 | Tang et al. | |
| 2003/0217289 A1 | 11/2003 | Ammon et al. | |
| 2003/0229696 A1 | 12/2003 | Klein et al. | |
| 2004/0049565 A1 | 3/2004 | Keller et al. | |
| 2004/0054766 A1 | 3/2004 | Vicente | |
| 2004/0185845 A1 | 9/2004 | Abhishek et al. | |
| 2005/0027858 A1 | 2/2005 | Sloth et al. | |
| 2005/0063317 A1* | 3/2005 | Risberg et al. | 370/254 |
| 2005/0135236 A1 | 6/2005 | Benson et al. | |
| 2006/0046709 A1 | 3/2006 | Krumm et al. | |
| 2006/0077946 A1 | 4/2006 | Adya et al. | |

FOREIGN PATENT DOCUMENTS

| | | | |
|---|---|---|---|
| WO | WO 2004/068786 A1 | 8/2004 | |

OTHER PUBLICATIONS

Aboba, B. and Simon, D. PPP EAP TLS Authentication Protocol. In *RFC 2716*, Oct. 1999.

Airdefense. Wireless LAN Security. Downloaded from http://airdefense.net. Jan. 24, 2005.

Airmagnet. AirMagnet Distributed System. Downloaded from http://airmagnet.com. Jan. 24, 2005.

Airtight Networks. SpectraMon. Downloaded from http://www.airtightnetworks.com. Jan. 24, 2005.

Airwave. AirWave Management Platform. Downloaded from http://airwave.com. Jan. 24, 2005.

Allman, M., Eddy, W. and Ostermann, S. Estimating Loss Rates With TCP. In *ACM Perf. Evaluation Review 31*(3), Dec. 2003.

Atheros Communications. Downloaded from http://www.atheros.com. Jan. 24, 2005.

Awerbuch, B., Holmer, D. and Rubens, H. Provably Secure Competitive Routing against Proactive Byzantine Adversaries via Reinforcement Learning. In *JHU Tech Report Version 1*, May 2003.

Bahl, P. and Padmanabhan, V. N. RADAR: An Inbuilding RF-based User Location and Tracking System. In *Proc. of IEEE INFOCOM*, Tel-Aviv, Israel, Mar. 2000.

Barford, P. and Crovella, M. Critical Path Analysis of TCP Transactions. In *Proc. of ACM SIGCOMM*, Stockholm, Sweden, Aug. 2000.

Bellardo, J. and Savage, S. Measuring Packet Reordering. In *Proc. of ACM Internet Measurement Workshop*, Marseille, France, Nov. 2002.

Bluetooth SIG. Location Working Group. http://bluetooth.org.

Buchegger, S. and Le Boudec, J. The Effect of Rumor Spreading in Reputation Systems for Mobile Ad-Hoc Networks. In *Proc. of WiOpt*, France, Mar. 2003.

Chandra, R., Bahl, R. P. and Bahl, P. MultiNet: Connecting to Multiple IEEE 802.11 Networks Using a Single Wireless Card. In *Proc. of IEEE INFOCOM*, Hong Kong, Mar. 2004.

Cisco. CiscoWorks Wireless LAN Solution Engine. Downloaded from http://cisco.com. Jan. 24, 2005.

Computer Associates. Unicenter Solutions: Enabling a Successful Wireless Enterprise. Downloaded from http://www3.ca.com/Files/WhitePapers/22996-enabling_a_successful.pdf Jan. 24, 2005.

Ethereal: A Network Protocol Analyzer. Downloaded from http://ethereal.com. Jan. 24, 2005.

Floyd, S., Handley, M., Padhye, J., and Widmer, J. Equation-Based Congestion Control for Unicast Applications. In *Proc. of ACM SIGCOMM*, Stockholm, Sweden, Aug. 2000.

Foley, J. D., van Dam, A., Feiner, S. K., and Hughes, J. F. *Computer Graphics Principles and Practice (2nd Edition)*. Addison Wesley, 1990.

IBM Research. Wireless Security Auditor (WSA). Downloaded from http://www.research.ibm.com/gsal/wsa. Jan. 24, 2005.

IEEE Computer Society. IEEE 802.1x-2001 IEEE Standards for Local and Metropolitan Area Networks: Port-Based Network Access Control, 1999.

IEEE Computer Society. Wireless LAN Medium Access Control (MAC) and Physical Layer (PHY) Specifications. *IEEE Standard 802.11*, 1999.

Ladd, A., Bekris, K., Rudys, A., Marceau, G., Kavraki, L., and Wallach, D. Robotics-Based Location Sensing using Wireless Ethernet. In *Proc. of ACM MobiCom*, Atlanta, GA, Sep. 2002.

Mahajan, R., Spring, N., Wetherall, D., and Anderson, T. User-level Internet Path Diagnosis. In *Proc. of ACM SOSP*, Bolton Landing, NY, Oct. 2003.

Marti, S., Giuli, T., Lai, K., and Baker, M. Mitigating Routing Misbehavior in Mobile Ad Hoc Networks. In *Proc. of ACM MobiCom*, Boston, MA, Aug. 2000.

Microsoft Corp. Native 802.11 Framework for IEEE 802.11 Networks. Downloaded from http://microsoft.com. Jan. 24, 2005.

Neuman, B. and Tso, T. An Authentication Service for Computer Networks. In *IEEE Communications*, Karlsruhe, Germany, Sep. 1994.

Padhye, J., Firoiu, V., Towsley, D., and Kurose, J. Modeling TCP Throughput: a Simple Model and its Empirical Validation. In *Proc. of ACM SIGCOMM*, Vancouver, BC, Sep. 1998.

Priyantha, N. B., Chakraborty, A. and Balakrishnan, H. The Cricket Location-Support System. In *Proc. of ACM MobiCom*, Boston, MA, Aug. 2000.

Qiu, L., Bahl, P., Rao, A., and Zhou, L. Fault Detection, Isolation, and Diagnosis in Multihop Wireless Networks. Technical Report MSR-TR-2004-11, Microsoft Research, Redmond, WA, Dec. 2003.

Raya, M., Hubaux, J. P., and I. Aad. Domino: A System to Detect Greedy Behavior in IEEE 802.11 Hotspots. In *Proc. of MobiSys*, Boston, MA, Jun. 2004.

Rigney, C., Rubens, A., Simpson, W., and Willens, S. Remote Authentication Dial in User Service (RADIUS). In *RFC 2138, IETF*, Apr. 1997.

Schulzrinne, H., Casner, S., Frederick, R. and Jacobson, V. RTP: A Transport Protocol for Real-Time Applications. In *RFC 1889, IETF*, Jan. 1996.

Stevens, R. *TCP/IP Illustrated* (vol. 1): *The Protocols*. Addison Wesley, 1994.

Symbol Technolgies Inc. SpectrumSoft: Wireless Network Management System. http://www.symbol.com.

Want, R., Hopper, A., Falcao, V. and Gibbons, J. The Active Badge Location System. *ACM Transactions on Information Systems*, 10(1), Jan. 1992.

WildPackets Inc. Airopeek Wireless LAN Analyzer. Downloaded from http://www.wildpackets.com. Jan. 24, 2005.

WinDump: tcpdump for Windows. Downloaded from http://windump.polito.it. Jan. 24, 2005.

Zhang, Y., Breslau, L, Paxson, V. and Shenker, S. On the Characteristics and Origins of Internet Flow Rates. In *Proc. of ACM SIGCOMM*, Pitsburgh, PA, Aug. 2002.

Zhang, Y., Duffield, N., Paxson, V., and Shenker, S. On the Constancy of Internet Path Properties. In *Proc. of ACM Internet Measurement Workshop*, San Francisco, CA, Nov. 2001.

\* cited by examiner

USING A CONNECTED WIRELESS COMPUTER AS A CONDUIT FOR A DISCONNECTED WIRELESS COMPUTER

CROSS-REFERENCE TO RELATED APPLICATIONS

The present application claims the benefit of Adya et al., U.S. Provisional Patent Application No. 60/613,055 entitled, "SYSTEM AND METHOD FOR DIAGNOSING FAULTS IN WIRELESS NETWORKS", filed on Sep. 24, 2004, which is hereby incorporated by reference in its entirety. The present application is related to co-pending application Ser. Nos. 11/047,189 and 11/047,022 entitled "DETECTING AND DIAGNOSING PERFORMANCE PROBLEMS IN A WIRELESS NETWORK THROUGH NEIGHBOR COLLABORATION" and "COLLABORATIVELY LOCATING DISCONNECTED CLIENTS AND ROGUE ACCESS POINTS IN A WIRELESS NETWORK", both filed on Jan. 31, 2005, and both hereby incorporated by reference in their entirety.

FIELD OF THE INVENTION

This invention relates generally to network operations, and more particularly, to diagnosing faults in wireless networks.

BACKGROUND OF THE INVENTION

The convenience of wireless networking has led to a wide-scale adoption of wireless networks (e.g., IEEE 802.11 networks). Corporations, universities, homes, and public places are deploying these networks at a remarkable rate. However, a significant number of "pain points" remain for end-users and network administrators. Users experience a number of problems such as intermittent connectivity, poor performance, lack of coverage, and authentication failures. These problems occur due to a variety of reasons such as poor access point layout, device misconfiguration, hardware and software errors, the nature of the wireless medium (e.g., interference, propagation), and traffic congestion. Users frequently complain about connectivity and performance problems, and network administrators are expected to diagnose these problems while managing corporate security and coverage. Their task is particularly difficult due to the unreliable nature of the wireless medium and a lack of intelligent diagnostic tools for determining the cause of these problems.

For companies with a large deployment of IEEE 802.11 networks, there may be several thousand Access Points (APs) spread over many buildings. Problems with the networks result in end-user frustration and loss of productivity for the corporation. Furthermore, resolution of each end-user complaint results in additional support personnel costs to a company's IT department; this cost can be several tens of dollars and this does not include the cost due to the loss of end-user productivity.

Fault diagnostics in IEEE 802.11 infrastructure networks has not garnered attention from the research community relative to other higher profile areas of research in wireless networking. Several companies attempt to offer diagnostic tools, but these products lack a number of desirable features. For example, they do not do a comprehensive job of gathering and analyzing the data to establish the possible causes of a problem. Furthermore, most products typically only gather data from the APs and neglect the client-side view of the network. Some products that monitor the network from the client's perspective require hardware sensors, which can be expensive to deploy and maintain. Also, current solutions do not typically provide any support for disconnected clients, even though these are the ones that need the most help.

BRIEF SUMMARY OF THE INVENTION

The problems outlined above may at least in part be addressed by a system and method for detecting and diagnosing faults in wireless networks as described herein.

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

In one embodiment, the system and method use client conduits to enable bootstrapping and fault diagnosis of disconnected clients. In some embodiments, client conduits are used to enable disconnected clients to diagnose their problems with the help of nearby clients. This technique may take advantage of the beaconing and probing mechanisms of IEEE 802.11 to ensure that connected clients do not pay unnecessary overheads for detecting disconnected clients.

In one embodiment, a computer-readable medium is provided including computer-executable instructions facilitating communications between an infrastructure network and a first wireless computing device disconnected from the network via a second wireless computing device connected to the network, the computer-executable instructions executing on the first wireless computing device and performing the steps of enabling a promiscuous mode on the first wireless computing device for monitoring wireless traffic on a plurality of channels, examining traffic packets of the second wireless computing device and determining that the second wireless computing device is connected to the infrastructure network, creating a new wireless network on a channel corresponding to the second wireless computing device, broadcasting a distress signal on the new wireless network, determining the distress signal in response to receiving an acknowledgement from the second wireless computing device, and starting an ad hoc wireless network for connection by the second wireless computing device.

In another embodiment, a computer-readable medium is provided including computer-executable instructions facilitating communications between an infrastructure network and a first wireless computing device disconnected from the network via a second wireless computing device connected to the network, the computer-executable instructions executing on the second wireless computing device and performing the steps of receiving a distress signal from the first wireless computing device, sending an acknowledgement of the distress signal to the first computing device, receiving a response, from the first wireless computing device, to the acknowledgement, and causing the second wireless computing device to enter a multinet mode and join an ad hoc network originated by the first wireless computing device, whereby the second wireless computing device is substantially simultaneously connected to both the ad hoc network and the infrastructure network.

In yet another embodiment, a system for allowing a disconnected wireless computing device to communicate with an infrastructure network via a wirelessly connected wireless computing device is provided, the system comprising a first diagnostic client program running on the disconnected wireless computing device, and a second diagnostic client program running on the connected wireless computing device, wherein the first diagnostic client program detects the presence of the connected wireless computing device, causes a distress signal to be sent, and creates an ad hoc wireless network on the disconnected wireless computing device, and wherein the second diagnostic client program receives the distress signal, enters a multinet mode, and connects to the ad hoc wireless network on the disconnected wireless computing device.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
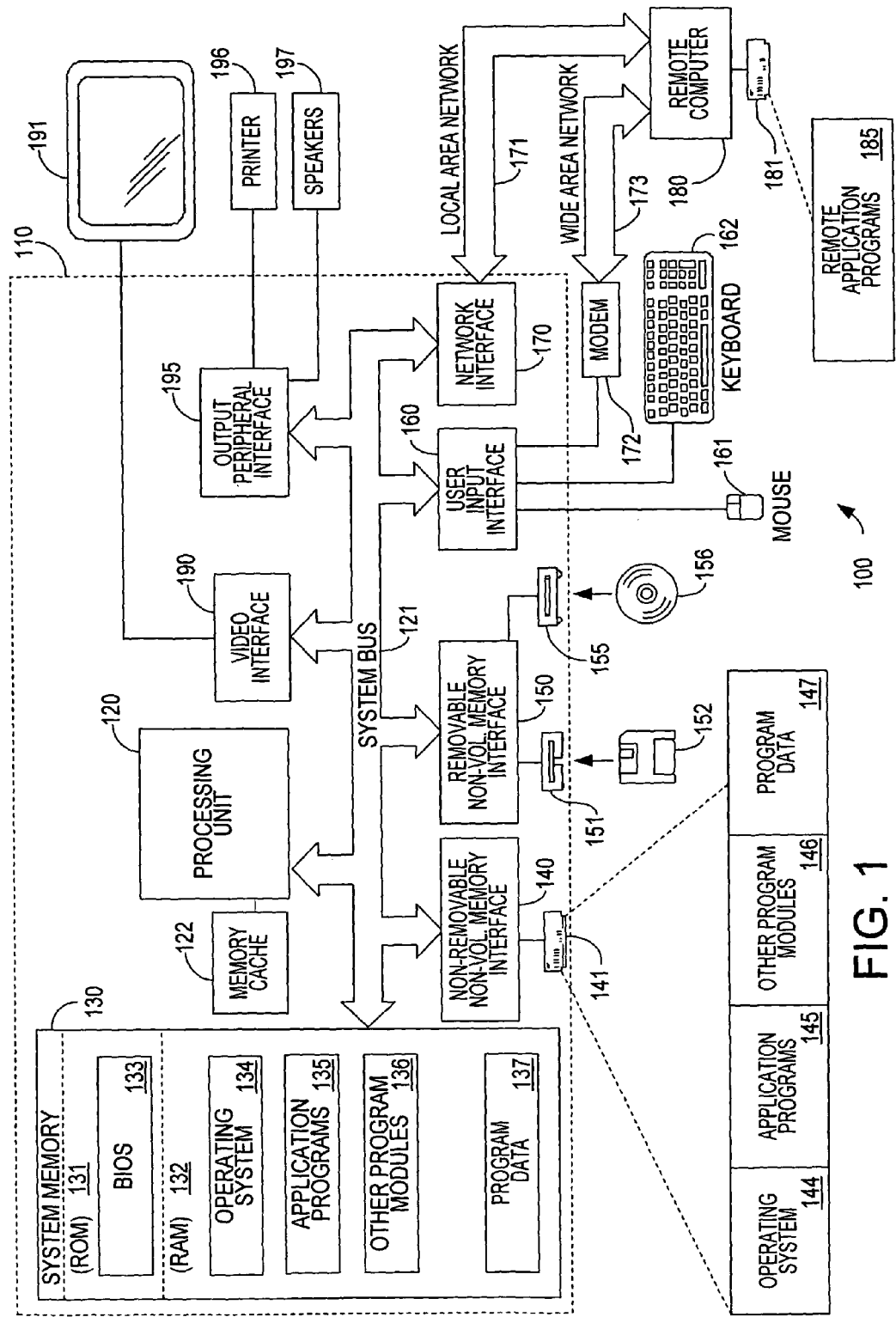
FIG. 1 is a simplified schematic illustrating an exemplary architecture of a computing, as used in accordance with an embodiment of the invention.

The methods and systems to allow disconnected computers to convey information to network administrators and support personnel through a connected computer will now be described with respect to preferred embodiments; however, the methods and systems of the present invention are not so limited. Moreover, the skilled artisan will readily appreciate that the methods and systems described herein are merely exemplary and that variations can be made without departing from the spirit and scope of the invention. After reviewing this description, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

Listed below are many of the problems that users and network administrators face when using and maintaining corporate wireless networks.

Connectivity problems: End-users complain about inconsistent or a lack of network connectivity in certain areas of a building. Such "dead spots" or "RF holes" can occur due to a weak RF signal, lack of a signal, changing environmental conditions, or obstructions. Locating an RF hole automatically is critical for wireless administrators; they can then resolve the problem by either relocating APs or increasing the density of APs in the problem area or by adjusting the power settings on nearby APs for better coverage.

Performance problems: This category includes all the situations where a client observes degraded performance, e.g., low throughput or high latency. There could be a number of reasons why the performance problem exists, e.g., traffic slow-down due to congestion, RF interference due to a microwave oven or cordless phone, multi-path interference, large co-channel interference due to poor network planning, or due to a poorly configured client/AP. Performance problems can also occur as a result of problems in the non-wireless part of the network, e.g., due to a slow server or proxy. It is therefore useful for the diagnostic tool to be able to determine whether the problem is in the wireless network or elsewhere. Furthermore, identifying the cause in the wireless part is important for allowing network administrators to better provision the system and improve the experience for end-users.

Network security: Large enterprises often use solutions such as IEEE 802.1x to secure their networks. However, a nightmare scenario for IT managers occurs when employees unknowingly compromise the security of the network by connecting an unauthorized AP to an Ethernet tap of the corporate network. The problem is commonly referred to as the "Rogue AP Problem". These Rogue APs are one of the most common and serious breaches of wireless network security. Due to the presence of such APs, external users are allowed access to resources on the corporate network; these users can leak information or cause other damage. Furthermore, Rogue APs can cause interference with other access points in the vicinity. Detecting Rogue APs in a large network via a manual process is expensive and time consuming; thus, it is important to detect such APs proactively.

Authentication problems: According to the IT support group's logs, a number of complaints are related to users' inability to authenticate themselves to the network. In wireless networks secured by technologies such as IEEE 802.1x, authentication failures are typically due to missing or expired certificates. Thus, detecting such authentication problems and helping clients to bootstrap with valid certificates is important.

The present invention will be more completely understood through the following detailed description, which should be read in conjunction with the attached drawings. In this description, like numbers refer to similar elements within various embodiments of the present invention. Aspects of the invention are illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

FIG. 1 illustrates an example of a suitable computing system environment 100 on which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. In particular, the computer 110 preferably contains a wireless networking interface or wireless card, operating according to an IEEE 802.11 protocol.

Figure 2:
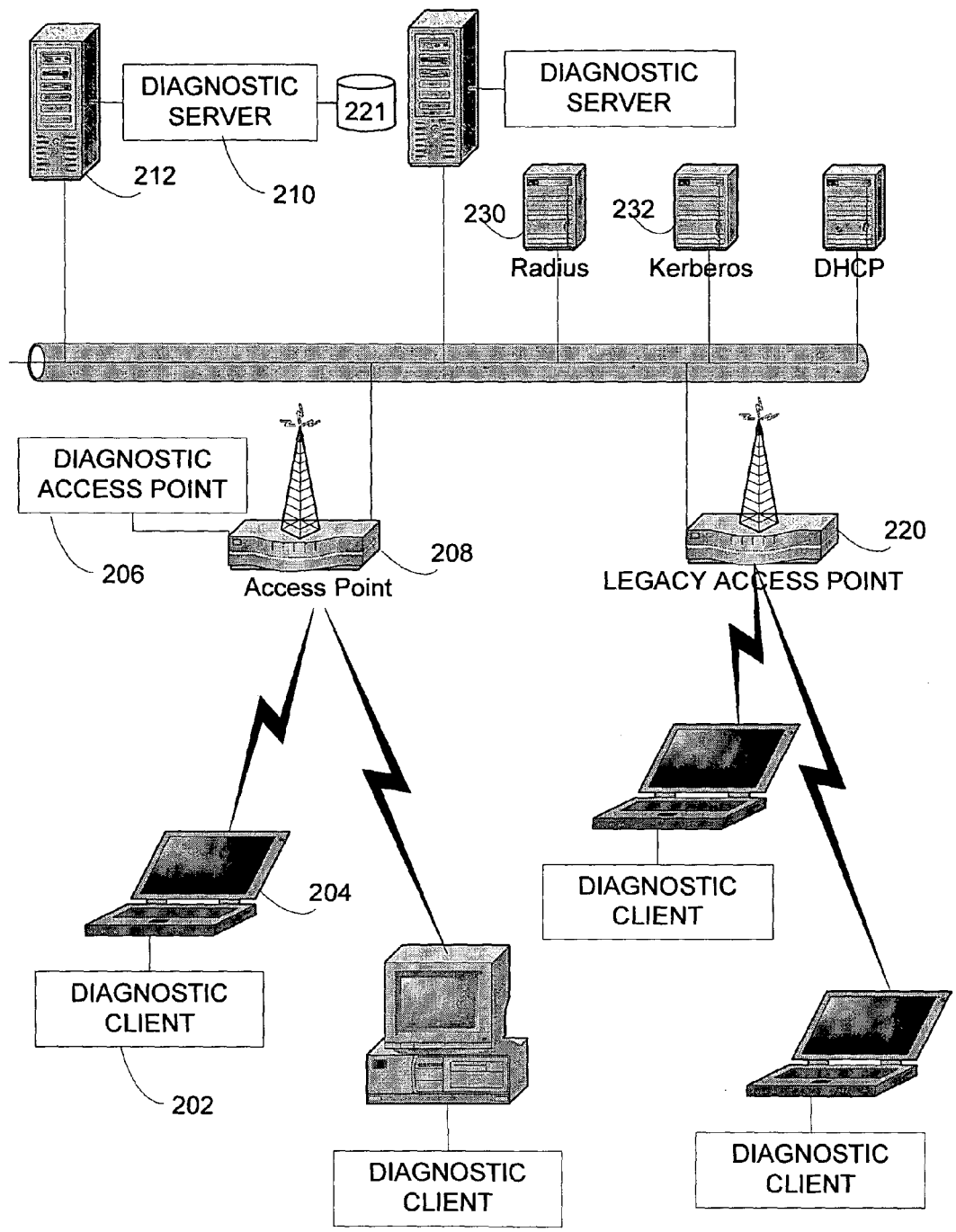
FIG. 2 is a diagram illustrating an exemplary wireless network for using a client conduit, in accordance with an embodiment of the invention

In an embodiment of the invention, a system consists of several components, as illustrated in FIG. 2. A Diagnostic Client (DC) 202 is software that runs on a wireless client machine 204. A Diagnostic AP (DAP) 206 runs on an Access Point 208. A Diagnostic Server (DS) 210 runs on a backend server 212 of the organization.

In some embodiments of the invention, the Diagnostic Client module 202 monitors the RF environment and the traffic flow from neighboring clients 214 and APs 216. During normal activity, the client's wireless card is not placed in promiscuous mode. The DC 202 uses the collected data to perform local fault diagnosis. Depending on the individual fault-detection mechanism, a summary of this data is transmitted to the DAPs 206 or DSs 210 at preferably regular intervals. In addition, the DC 202 is programmed to accept commands from the DAP 206 or the DS 210 to perform on-demand data gathering, e.g., switching to promiscuous mode and analyzing a nearby client's performance problems. In case the wireless client 204 becomes disconnected, the DC 202 logs data to a local database/file. This data can be analyzed by the DAP 206 or DS 210 at some future time when network connectivity is resumed.

The Diagnostic AP 206 accepts diagnostic messages from DCs 202, merges them along with its own measurements and sends a summary report to the DS 210. Some embodiments of the invention do not include the Diagnostic AP 206. The DAP 206 offloads work from the DS 210. Some embodiments of the invention include a mixture of legacy APs 220 and DAPs 206: if an AP is a legacy AP 220 (for example, an AP not running a Diagnostic AP), its monitoring functions are performed by the DCs 202 and its summarizing functions and checks are performed at the DS 210.

The Diagnostic Server 210 accepts data from DCs 202 and DAPs 206 and performs the appropriate analysis to detect and diagnose different faults. The DS 210 also has access to a database 221 that stores each AP's 208 location. Network administrators can deploy multiple DSs 210 in the system to balance the load, for example, by hashing each AP's MAC address to a particular DS 210. In some embodiments, the Diagnostic Server 210 interacts with other network servers, such as a RADIUS 230 and Kerberos 232 servers, to get client authorization and user information.

The exemplary system described with reference to FIG. 2 supports both reactive and proactive monitoring. In proactive monitoring, DCs and DAPs monitor the system continuously: if an anomaly is detected by a DC, DAP, or DS, an alarm is raised for a network administrator to investigate. The reactive monitoring mode is used when a support personnel wants to diagnose a user complaint. The personnel can issue a directive to a particular DC from one of the DSs to collect and analyze the data for diagnosing the problem.

The exemplary system imposes negligible overheads with respect to power management. Both the proactive and reactive techniques described later consume very little bandwidth, CPU, or disk resources; as a result, they have negligible impact on battery consumption. The exemplary system architecture shown in FIG. 2 supports several functions in embodiments of the invention by using the DCs, DAPs and DSes. Some of the supported functions include: locating disconnected clients; helping disconnected clients; isolating performance problems; and detecting rogue access points.

In some embodiments of the invention, the DAP 206 is a software modification on AP 208, allowing for better scalability and for analyzing an AP's performance. Since no hardware modifications are necessary, the bar for deploying this embodiment is lower.

The client machines 204 and access points 208 preferably have the ability to control beacons and probes. Additionally, client machines 204 preferably have the capability of starting an infrastructure network (i.e., becoming an AP) or an ad hoc network (i.e., computer-to-computer) on their own; this ability is supported by many wireless cards currently available in the marketplace. Some embodiments of the invention make use the presence of nearby clients or access points. By taking advantage of nearby clients and access points instrumented with software "sensors", deployment costs are potentially lowered.

The backend server 212 preferably uses a database to maintain the location of all the access points in the network. Such location databases are preferably maintained by network administrators.

The exemplary system illustrated in FIG. 2 can scale with the number of clients and APs in the system. The system contains two shared resources: DSs and DAPs. To prevent a single Diagnostic Server from becoming a potential bottleneck, additional DSs are preferably added as the system load increases. Furthermore, some embodiments allow each individual DS to offload work by sharing the diagnosis burden with the DCs and the DAPs; the DS is used only when the DCs and DAPs are unable to diagnose the problem and the analysis requires a global perspective and additional data (e.g., signal strength information obtained from multiple DAPs may be needed for locating a disconnected client).

Similarly, since the DAP is a shared resource, making it do extra work can potentially hurt the performance of all its associated clients. To reduce the load on a DAP, some embodiments of the invention use an optimization technique, whereby an AP does not perform active scanning if any client is associated with it; the associated clients perform these operations as needed. The AP continues to perform passive monitoring activities that have a negligible effect on its performance. If there is no client associated, the AP is idle and it can perform these monitoring operations. This approach ensures that most of the physical area around the AP is monitored without hurting the AP's performance.

In one embodiment, the interactions between the DC, DAP, and DS are secured using EAP-TLS certificates issued over IEEE 802.1x. An authorized certification authority (CA) issues certificates to DCs, DAPs and DSs; these certificates are used to ensure that all communication between these entities is mutually authenticated. One embodiment includes known techniques for detecting malicious behavior by legitimate users.

Figure 3:
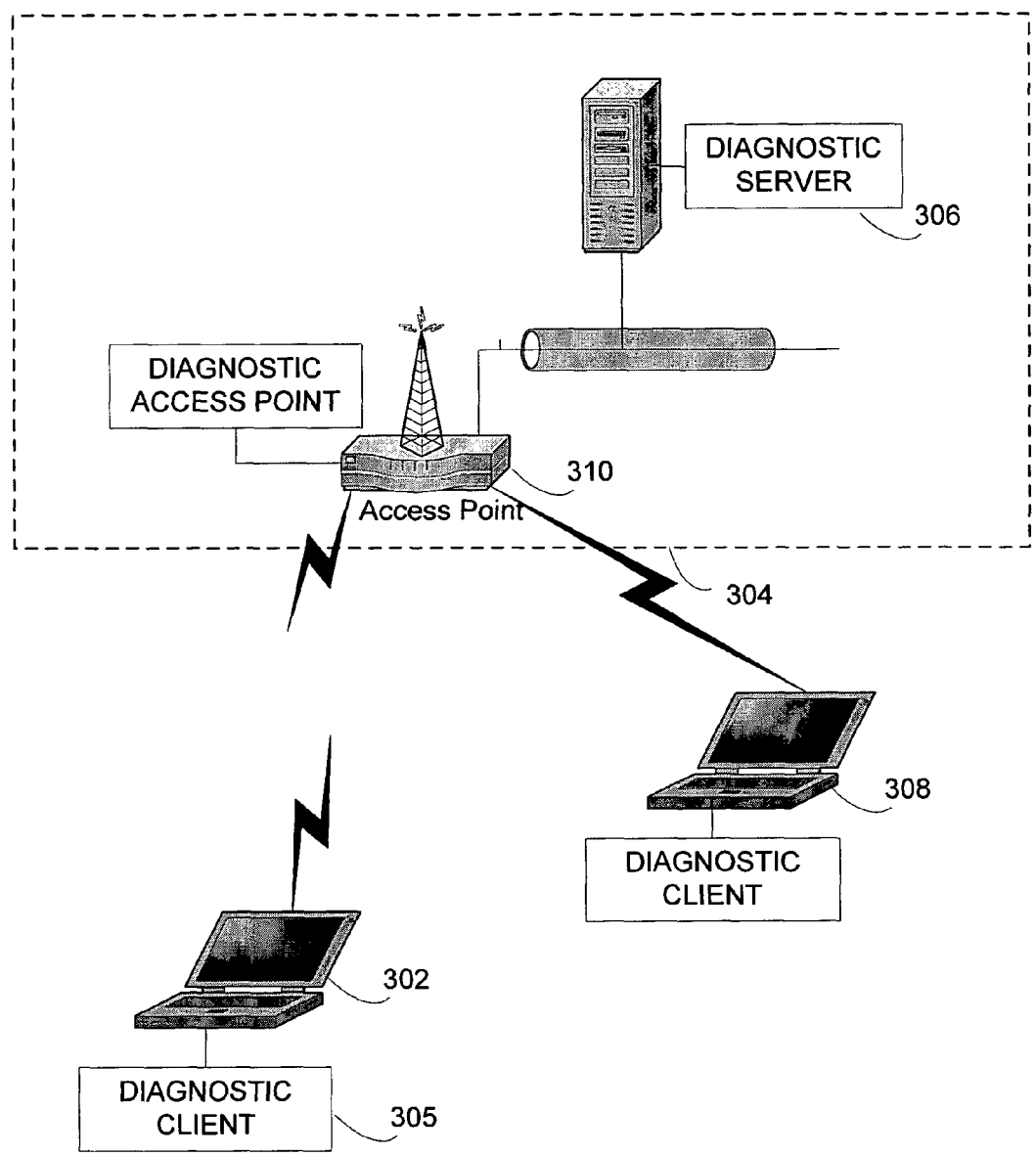
FIG. 3 is a diagram illustrating the communication between a connected computer and a disconnected computer, in accordance with an embodiment of the invention.

Turning attention to FIG. 3, a "Client Conduit" mechanism is described that allows disconnected wireless clients to convey information to network administrators and support personnel, in accordance with an embodiment of the invention. If a wireless client 302 cannot connect to the network 304, the DC 305 residing on the client 302 logs the problem in its database. When the client 302 is connected later (e.g., via a wired connection), this log is uploaded to the DS 306, which performs the diagnosis to determine the cause of the problem. However, sometimes it is possible that this client 302 is in the range of other connected clients; this client 302 may be disconnected since it is just outside the range of any AP, or due to authentication problems. In this situation, it is desirable to perform fault diagnosis with the DS 306 immediately and, if possible, rectify the problem.

The IEEE 802.11 standard does not allow a client to be connected to two networks at the same time. Thus, existing techniques cannot be used to have a disconnected node 302 simply send a message to its connected neighbor 308. Since the connected node 308 is already associated to an infrastructure network 304, it cannot simultaneously connect to an ad-hoc network with the disconnected client 302—if it wants to receive a message from the disconnected client 302, it first has to disconnect and then join the ad-hoc network started by the client 302. This is inefficient and unfair to a normally-functioning connected client. Some embodiments solve this problem by using multiple radios on the connected client 308 (one dedicated on an ad hoc network for diagnosis), or by using MultiNet (which allows a client to multiplex a single wireless card such that it is present on multiple networks), or by making the connected client 308 periodically scan all channels (for example, after entering a promiscuous mode to detect a distress signal from a disconnected client). In contrast to these approaches, the Client Conduit mechanism, as used in an embodiment of the invention, imposes no overhead in the common case when no disconnected clients are present in the neighborhood.

In accordance with an embodiment of the invention, the Client Conduit mechanism allows a disconnected client 302 to be diagnosed by a DS 306 via one of the neighboring connected clients 308. Client Conduit avoids penalizing connected clients by exploiting two operational facts about the IEEE 802.11 protocol. First, even when a client 308 is associated to an AP 310, it continues to receive beacons from neighboring APs or ad hoc networks at regular intervals. Second, a connected client 308 can send directed or broadcast probe requests without disconnecting from the infrastructure network 304.

Figure 4:
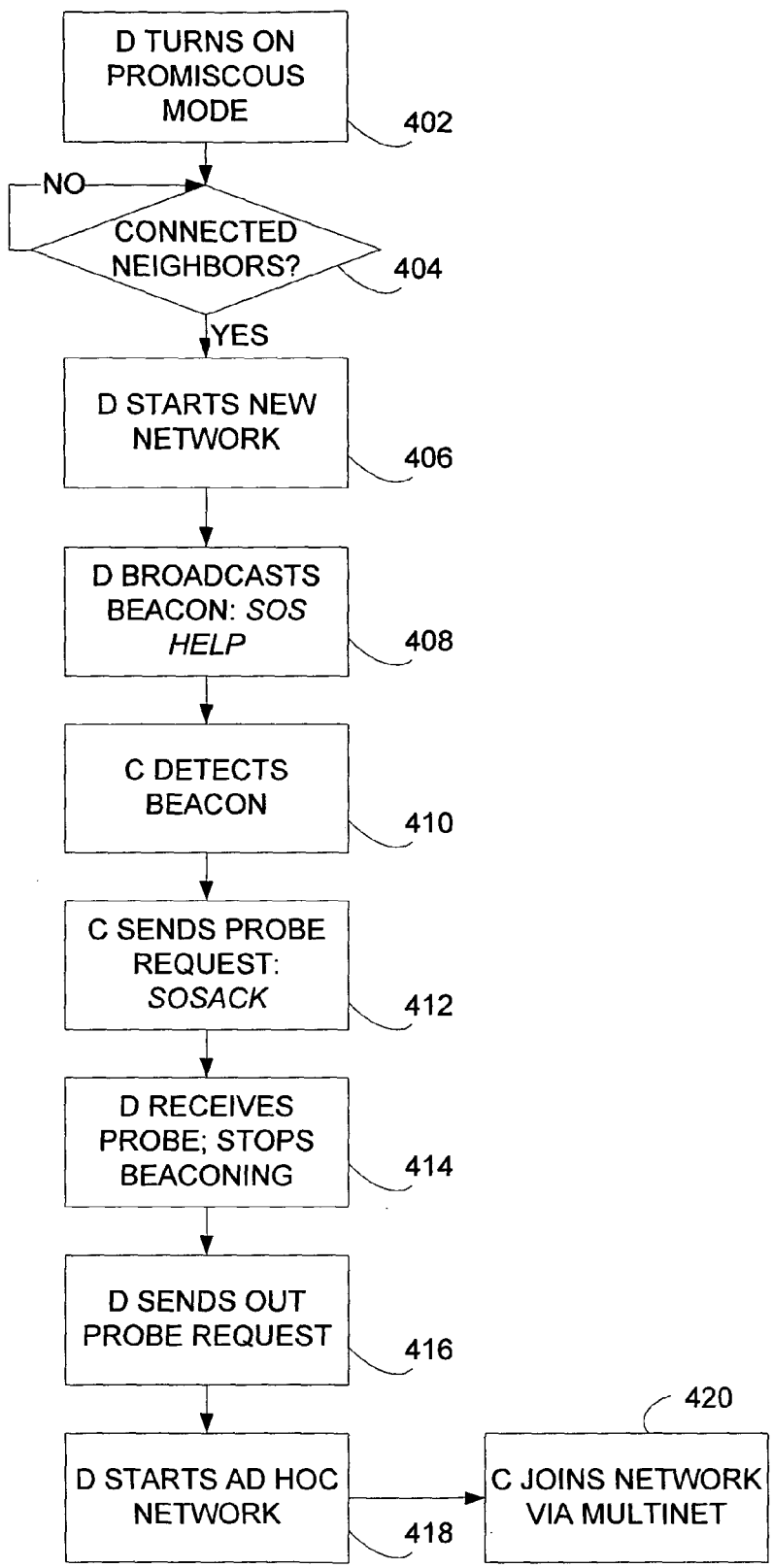
FIG. 4 is a flow diagram illustrating a method for facilitating communication from a disconnected computer to a wireless network, in accordance with an embodiment of the invention.

Turning to FIG. 4, a Client Conduit method is described for a scenario where a disconnected client D is in the vicinity of a connected client C. At step 402, the DC on the disconnected client D configures the machine to operate in promiscuous mode. It scans all channels to determine at step 404 if any nearby client is connected to the infrastructure network. If it detects such a connected client on a channel, it starts a new infrastructure or an ad hoc network on the channel on which it detected the client's packets at step 406. Preferably, client D switches mode to become an AP and starts an infrastructure network, and alternatively, client D starts an ad hoc network. Client D preferably determines whether the data packet is part of an infrastructure network and is being sent to/from an AP by examining the ToDS and FromDS fields of IEEE 802.11 data frames.

At step 408, the newly-formed AP at D broadcasts its beacon as if it were a regular AP, with an SSID of the form "SOS HELP <num>" where num is a 32-bit random number to differentiate between multiple disconnected clients. Alternatively, D sends out broadcast packets rather than beacons. The beacons or broadcast packets act as a distress signal to notify neighboring clients.

At step 410, the DC on the connected client C detects the SOS beacon of this new AP. At this point, C informs D that its request has been heard, with an acknowledgment in the following manner: If client C were to try connecting to D, it would need to disconnect from the infrastructure network, thereby hurting the performance of C's applications. Instead, client C uses the "active scanning" mechanism of IEEE 802.11 networks—C sends a Probe Request of the form "SOS ACK <num>" to D at step 412. The Probe Request is preferably sent with a different SSID than the one being advertised by the AP running on D. This approach prevents some other nearby client that is not involved in the Client Conduit protocol from inadvertently sending a Probe Request to D (as part of that client's regular tests of detecting new APs in its environment). Alternatively, C sends out broadcast packets with a proprietary message rather than an 802.11 probe request as the acknowledgment.

When D hears this Probe Request (and perhaps other requests as well), it stops being an AP and becomes a station again at step 414. Additionally, in response to the Probe Request received from C, a Probe Response is sent out by D at step 416; client C now knows that it does not need to send more Probe Requests (it would have stopped anyway when D's beacons stopped). More importantly, D's Probe Response indicates whether D would like to use client C as a hop for exchanging diagnostic messages with the DS. This response mechanism ensures that if multiple connected clients try to help D, only one of them is chosen by D for setting up the conduit with the DS.

At step 418, D starts an ad hoc network and, at step 420, C joins this network via MultiNet. Additional details on MultiNet, in accordance with an embodiment of the invention, are found in co-pending U.S. patent application Ser. No. 10/428,218, filed May 2, 2003, and hereby incorporated by reference for all that it teaches without exclusion of any part thereof. Steps taken to this point are referred to as a "Connection Setup" phase. At this point, C becomes a conduit for D's messages, and a "Data Transfer" phase begins where D can exchange diagnostic messages with the DS through C.

Through the use of methods such as that described in FIG. 4, embodiments of the invention employing the Client Conduit protocol ensure that connected clients do not experience unnecessary overheads during normal operation. Furthermore, some embodiments use the Client Conduit mechanism for bootstrapping clients. For example, suppose that a client tries to access a wireless network for the first time and does not have EAP-TLS certificates, but has other credentials such as Kerberos credentials. An embodiment of the invention uses the Client Conduit mechanism to authenticate the user/machine with the backend Radius/Kerberos servers. New certificates are then installed on the client machine, or a client's expired certificates are refreshed without requiring a wired connection. It is possible that a client D is within the range of an AP and is disconnected because of IEEE 802.1x authentication problems. An embodiment uses the Client Conduit mechanism if a connected client is in range as well. If there is no such client, one can dynamically configure the AP to allow D's diagnostic messages to the back end DS (or to the RADIUS servers who can forward to the DS) via an uncontrolled port.

Embodiments of the invention manage security risks that may be introduced through the use of a Client Conduit mechanism. For example, some embodiments ensure that a malicious/unauthorized client does not obtain arbitrary access to the network by requiring the connected client to allow a disconnected client's packets to be exchanged only with the DS or backend authentication servers. Other security and performance risks are similarly managed, as described below.

When a connected client C helps a disconnected client via Client Conduit, in some embodiments it is preferable to ensure that C's application's performance is not adversely affected. To this end, during the connection setup, as described with reference to FIG. 4, for example, the connected client C processes the beacon message and sending/receiving probe messages; no messages are forwarded by C on the disconnected client's behalf. These steps not only consume negligible resources on C but they also do not result in any security leak or compromise on C. Additionally, C can further rate-limit or stop performing these steps if it discovers that the disconnected client is making it perform these steps often.

Figure 5:
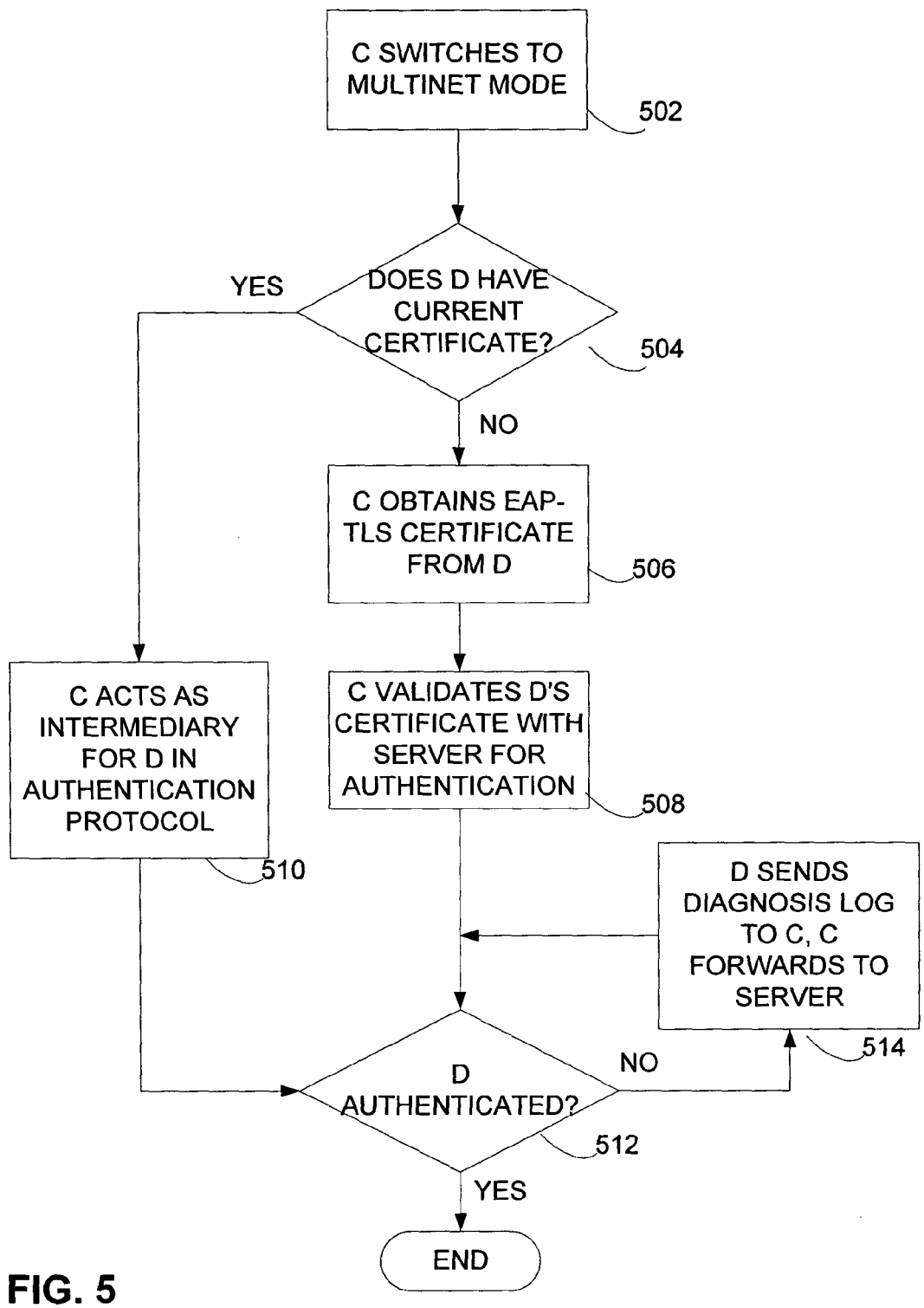
FIG. 5 is a flow diagram illustrating a method for detecting performance degradation of helping clients, in accordance with an embodiment of the invention.

Once the connection is established and data transfer begins, embodiments manage possible security and denial-of-service attacks. There is a risk that a malicious client could waste a connected client C's resource by making it enter MulitNet mode unnecessarily, thus consuming bandwidth. To prevent this problem, the following authentication step is preferably taken before data transfer to ensure that only legitimate clients are allowed to connect via client C, as shown in FIG. 5. After the Connection Setup phase, client C switches to MultiNet mode at step 502 for performing authentication. To prevent a denial-of-service (DoS) attack where C is forced into MultiNet mode repeatedly, C preferably limits the number of times per minute that it performs such an authentication step. As part of the authentication step, client C checks if D has a EAP-TLS machine certificate at step 504. If so, C obtains the certificate from the disconnected client at step 506 and validates it at step 508 (for ensuring mutual authentication, client D preferably performs these steps as well). If the disconnected client has no certificates or its certificates have expired, client C acts as an intermediary for running the desired authentication protocol at step 510, e.g., C could help D perform Kerberos authentication from the back end Kerberos servers and obtain the relevant tickets. C checks with the DS to see if D is authenticated at step 512. If the disconnected client D still cannot authenticate, C asks D to send the last several kilobytes (e.g., 10 Kbytes) of its diagnosis log to C and C forwards this log to the DS at step 514. To prevent a possible DoS attack in which a malicious client tries to send this unauthenticated log repeatedly (e.g., while spoofing different MAC addresses), the connected client preferably limits the total amount of unauthenticated data that it sends in a fixed time period, e.g., C says that it will send at most 10 KBytes of such data every 5 minutes.

Embodiments of the invention further manage security risks by allowing connected client C to control the amount of resources that it wants to allocate for the disconnected client D during the MultiNet transfer, even when helping a legitimate client. A software "knob" is provided to the client that allows it to limit the percentage of time spend on the ad hoc network relative to the infrastructure network; client C can also limit this usage to save battery power.

An additional security risk addressed by embodiments of the invention concerns unauthorized or "rogue" access points. An attacker who wants to set up an unauthorized AP and remain undetected may try to exploit the properties of Client Conduit: the attacker's AP is set up to beacon with an SOS SSID. Embodiments distinguish between the cases where the beaconing device is a legitimate client and where it is actually a rogue AP. In Client Conduit, when a disconnected client becomes an AP or starts an ad hoc network during the Connection Setup and starts beaconing, it does not send or receive any data packets. Thus, if a DC ever detects an AP (or a node in ad hoc mode) that is beaconing the SOS SSID and sending/receiving data packets, the DC immediately flags it as a rogue device. Additionally or alternatively, when the helping client hears the Probe Response in of the Client Conduit protocol described with reference to FIG. 4, it knows that the disconnected client no longer needs to beacon. Thus, if the helping client continues to hear the SOS beacons after a few seconds, it flags the device as a disguised Rogue device.

Figure 6:
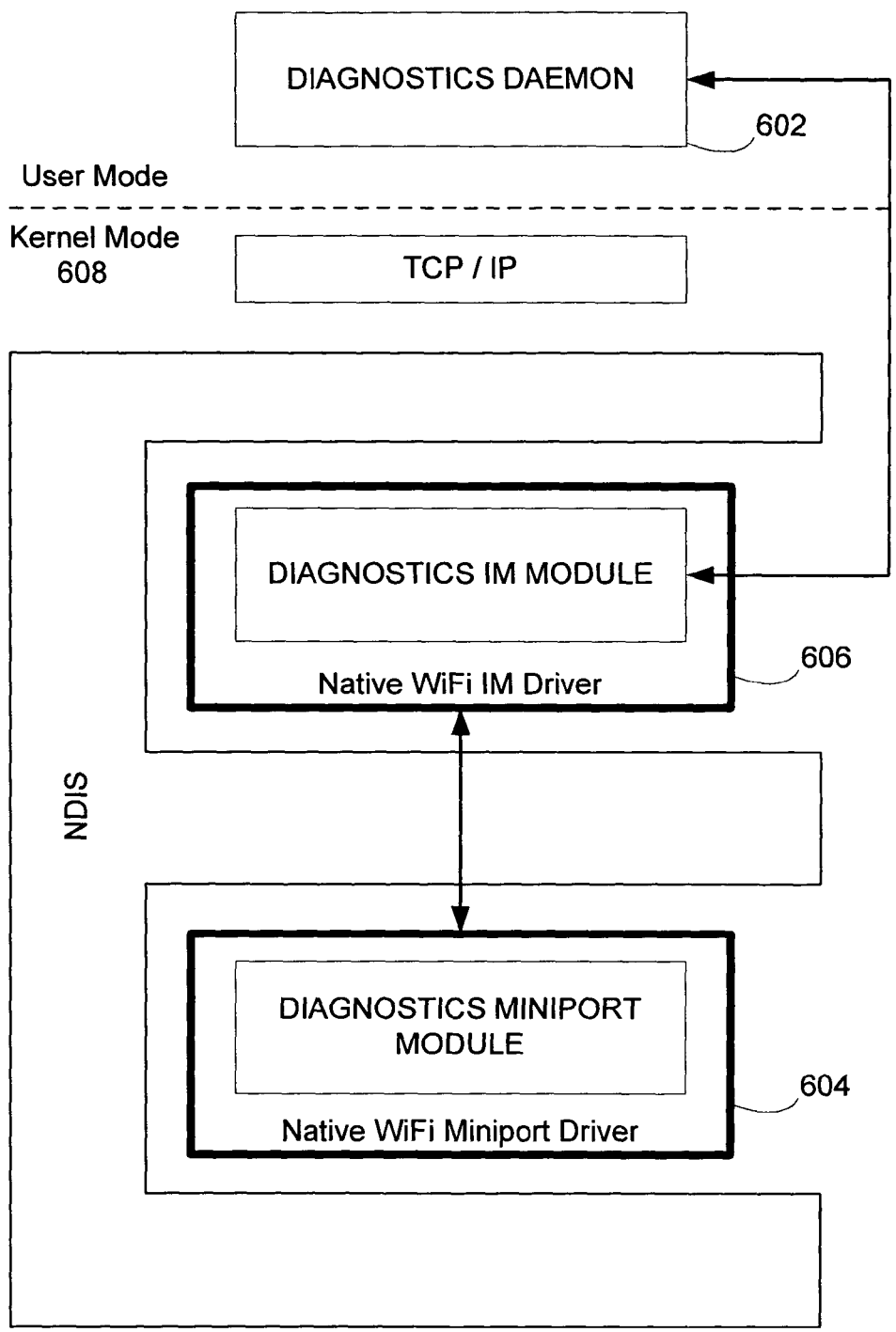
FIG. 6 is a block diagram of one illustrative implementation according to an embodiment of the invention that includes daemons that may run on clients, access points and servers.
Figure 6:

Turning attention to FIG. 6, details of one embodiment of an implementation are shown. The basic architecture consists of the DC, DAP and DS daemons running on clients, access points and servers, respectively. The system can be implemented, for example, on the MICROSOFT WINDOWS operating system with standard commercial 802.11b cards. On the DS, the daemon process accepts information from DAPs. The DS reads the list of legitimate APs from a file or database. The structure of the code on the DC or DAP preferably comprises a user-level daemon 602 and kernel level drivers 604 and 606. These pieces are structured such that code is added to the kernel drivers 604 and 606 only if the functionality cannot be achieved in the user-level daemon 602 or if the performance penalty is too high.

There are two kernel drivers in the exemplary system—a miniport driver 604 and an intermediate driver (IM driver) 606, such as the Native WiFi driver in the MICROSOFT WINDOWS operating system. The miniport driver 604 communicates directly with the hardware and provides basic functionalities such as sending/receiving packets, setting channels, etc. It exposes sufficient interfaces such that functions like association, authentication, etc. can be handled in the IM driver 606. The IM driver 606 supports a number of interfaces (exposed via ioctls) for querying various parameters such as the current channel, transmission level, power management mode, SSID, etc. In addition to allowing the parameters to be set, it allows the user-level code to request for active scans, associate with a particular SSID, capture packets, etc. In general, it provides a significant amount of flexibility and control to the user-level code.

Even though many operations are already present in the IM driver 606, embodiments of the invention used modifications to expose certain functionalities and to improve performance of specific protocols. The miniport driver 604 is preferably changed minimally to expose certain types of packets to the IM driver 606. In the IM driver 606, the following support is preferably added: capturing packet headers and packets; storing the RSSI values from received packets; keeping track of AP information; and kernel event support for protocol efficiency. These modifications are now discussed in further detail.

Capturing packet headers and packets: Embodiments of the invention allow filters to be set such that only certain packets or packet headers are captured, e.g., filters based on specific MAC addresses, packet types, packet subtypes (such as management and beacon packets), etc.

Storing the RSSI values from received packets: Embodiments of the invention obtain the RSSI value of every received packet and maintain a table called the NeighborInfo table that keeps track of the RSSI value from each neighbor (indexed on the MAC address). An exponentially weighted average is maintained with the new value given some weighting factor of, for example, 0.25.

Keeping track of AP information: In the NeighborInfo table, embodiments keep track of the channels on which packets were heard from a particular MAC address, SSID information (from beacons), and whether the device is an AP or a station.

Kernel event support for protocol efficiency: An event is preferably added that is shared between the kernel and user-level code. The kernel triggers this event when an "interesting" event occurs; this allows some of the protocols to be interrupt-driven rather being polling based. In one embodiment, the kernel sets this event whenever it hears an SOS beacon from a disconnected client during Client Conduit, thereby resulting in lower protocol latency.

Additionally, a number of ioctls are preferably added to get and clear the information discussed above.

In embodiments of the invention, the diagnostics daemon 602 runs on a device and gathers information and implements various mechanisms discussed above, e.g., perform Client Conduit, etc. If the device is an AP, it communicates diagnostic information with the DS and the DCs; if the device is just a DC, it communicates with its associated AP to convey the diagnostic information. The Diagnostic daemon on the DC obtains the current NeighborInfo table from the kernel 608 at a periodic interval, for example every 30 seconds. If any new node has been discovered or if the existing data has changed significantly (e.g., RSSI value of a client has changed by more than a factor of 2), it is sent to the DAP. The DAP also preferably maintains a similar table indexed on MAC addresses. However, it only sends information about disconnected clients and APs to the DS; otherwise, the DS would end up getting updates for every client in the system, making it less scalable. The DAP sends new or changed information about APs to the DS periodically (e.g., 30 seconds). Furthermore, if the DAP has any pending information about a disconnected client D, it informs the DS immediately so that the disconnected can be serviced in a timely fashion. All messages from the DC to the DAP and from DAP to the DS are preferably sent as XML messages. A sample message format from the DC is shown below (timestamps have been removed):

```
<DiagPacket Type="RSSIInfo" TStamp="...">
  <Clients TStamp="...">
    <MacInfo MAC="00:40:96:27:dd:cc" RSSI="23"
      Channels ="19" SSID="" TStamp="..."/>
  </Clients>
  <Real-APs TStamp="...">
    <MacInfo MAC="00:20:a6:4c:c7:85" RSSI="89"
      Channels="12" SSID="UNIV_LAN" TStamp="..."/>
    <MacInfo MAC="00:20:a6:4c:bb:ad" RSSI="7"
      Channels="10" SSID="EXPER" TStamp="..."/>
```

-continued

```
  </Real-APs>
  <Disconnected-Clients TStamp="...">
    <MacInfo MAC="00:40:96:33:34:3e" RSSI="57"
      Channels="2048" SSID="SOS_764" TStamp="..."/>
  </Disconnected-Clients>
</DiagPacket>
```

As the sample message shows, the DC sends information about other connected clients, APs, and disconnected clients. For each such class of entities, it sends the MAC address of a machine along with RSSI, SSID, and a channel bitmap which indicates the channels on which the particular device was overheard.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-readable storage medium encoded with instructions that, when executed, perform a method comprising acts of:
    attempting to connect to an infrastructure network directly from a first wireless computing device; and
    in response to failing to connect to the infrastructure network directly, performing acts of:
        enabling a promiscuous mode on the first wireless computing device for monitoring wireless traffic on a plurality of channels;
        examining traffic packets of a second wireless computing device and determining that the second wireless computing device is connected to the infrastructure network;
        creating a new wireless network on a channel corresponding to the second wireless computing device;
        broadcasting a distress signal on the new wireless network;
        terminating the distress signal in response to receiving an acknowledgement from the second wireless computing device;
        starting an ad hoc wireless network via the first wireless computing device for connection by the second wireless computing device; and
        transmitting information from the first wireless computing device to the infrastructure network via the ad hoc wireless network.

2. The computer-readable storage medium of claim 1, wherein the method further comprises an act of transmitting an acknowledgement to the second wireless computing device prior to starting the ad hoc network.

3. The computer-readable storage medium of claim 1, wherein the method further comprises an act of sending authentication information to the second wireless computing device in order to be authenticated with the infrastructure network.

4. The computer-readable storage medium of claim 1, wherein the method further comprises an act of sending diagnostic messages to the infrastructure network via the second wireless computing device.

5. The computer-readable storage medium of claim 1 wherein creating the new wireless network comprises causing the first wireless computing device to start an ad hoc network or to behave as a wireless access point, and wherein the distress signal comprises a beacon according to a known wireless protocol.

6. The computer-readable storage medium of claim 5 wherein the beacon comprises a random number.

7. The computer-readable storage medium of claim 1 wherein the distress signal comprises broadcast packets configured according to a public or proprietary protocol.

8. A computer-readable storage medium encoded with instructions that, when executed, perform a method for facilitating communications between a first wireless computing device and an infrastructure network, via a second wireless computing device connected to the infrastructure network, wherein the first computing device is not connected to the infrastructure network, the method comprising acts of:
    receiving, at the second wireless computing device, a distress signal from the first wireless computing device;
    sending an acknowledgement of the distress signal from the second wireless computing device to the first computing device;
    receiving at the second wireless computing device a response, from the first wireless computing device, to the acknowledgement;
    causing the second wireless computing device to join an ad hoc network originated by the first wireless computing device, whereby the second wireless computing device is substantially simultaneously connected to both the ad hoc network and the infrastructure network;
    receiving information from the first wireless computing device via the ad hoc network; and
    transmitting the received information to the infrastructure network.

9. The computer-readable storage medium of claim 8 wherein the second wireless computing device joins the ad hoc network via a multinet mode.

10. The computer-readable storage medium of claim 9, wherein the method further comprises an act of causing the second wireless device to enter the multinet mode as a result of receiving the response to the acknowledgment.

11. The computer-readable storage medium of claim 8 wherein the second wireless computing device comprises two or more wireless adapters, and wherein the second wireless computing device is connected with the infrastructure network via one wireless adapter, and is connected with the first wireless computing device via another wireless adapter.

12. The computer-readable storage medium of claim 8, wherein the method further comprises an act of periodically scanning for distress signals from wireless computing devices disconnected from the infrastructure network.

13. The computer-readable storage medium of claim 8 wherein the distress signal comprises a network identification label, and wherein the acknowledgement comprises a network identification label that is different from the network identification label included in the distress signal.

14. The computer-readable storage medium of claim 8 wherein the acknowledgement is an 802.11 probe request.

15. The computer-readable storage medium of claim 8, wherein the method further comprises acts of:
    receiving authentication information from the first wireless computing device; and
    transmitting the authentication information to the infrastructure network.

16. The computer-readable storage medium of claim 15, wherein the method further comprises acts of:
    receiving credentials for the first wireless computing device from the infrastructure network; and
    transmitting the credentials to the first wireless computing device.

17. The computer-readable storage medium of claim 16 wherein the transmitted credentials allow the first wireless computing device to wirelessly connect directly with the infrastructure network.

18. The computer-readable storage medium of claim 8, wherein the method further comprises acts of:
    receiving diagnostic messages from the first wireless computing device; and
    transmitting the diagnostic messages to the infrastructure network via the second wireless computing device.

19. The computer-readable storage medium of claim 9 wherein the allocation of time for the connections to the infrastructure and ad hoc networks in multinet mode is controlled through a configurable setting.

20. The computer-readable storage medium of claim 8, wherein the method further comprises acts of:
    continuing to receive distress signals from the first computing device after receiving a response to the acknowledgement; and
    identifying the first computing device as a rogue device.

21. A system for allowing a disconnected wireless computing device to communicate with an infrastructure network via a wirelessly connected wireless computing device, the system comprising:
    a first diagnostic client program running on the disconnected wireless computing device; and
    a second diagnostic client program running on the connected wireless computing device, wherein the connected wireless computing device is connected to the infrastructure network via an access point;
    wherein the first diagnostic client program:
        detects the presence of the connected wireless computing device and determines that the connected wireless device is connected to the infrastructure network by examining traffic packets sent from the connected wireless device;
        causes a distress signal to be sent;
        creates an ad hoc wireless network on the disconnected wireless computing device;
        and transmits diagnostic information to the connected wireless computing device via the ad hoc wireless network; and,
    wherein the second diagnostic client program:
        receives the distress signal;
        connects to the ad hoc wireless network on the disconnected wireless computing device while maintaining a substantially simultaneous connection to the infrastructure network;
        receives the diagnostic information from the first diagnostic client program running on the disconnected wireless computing device, and
        forwards the diagnostic information to the infrastructure network.

22. The system of claim 21 wherein the second diagnostic client program connects to the ad hoc network after entering a multinet mode.

23. The system of claim 21 further comprising a diagnostic server program running on a network server on the infrastructure network, wherein the diagnostic server program receives authentication information sent on behalf of the disconnected wireless computing device by the second diagnostic client program running on the connected wireless computing device.

24. The system of claim 21 wherein the diagnostic server program facilitates authentication of the disconnected wireless computing device and transmits credentials for the disconnected wireless computing device via the second diagnostic client program running on the connected wireless computing device.

25. The system of claim 21 wherein the second diagnostic client program running on the connected wireless computing device receives diagnostic information from the first diagnostic program running on the disconnected wireless computing device, and wherein the second diagnostic client program forwards the diagnostic information to the diagnostic server program.

* * * * *